United States Patent
Anderson

(10) Patent No.: US 7,365,671 B1
(45) Date of Patent: Apr. 29, 2008

(54) COMMUNICATION CHANNEL WITH UNDERSAMPLED INTERPOLATIVE TIMING RECOVERY

(75) Inventor: Kent D. Anderson, Broomfield, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/545,654

(22) Filed: Oct. 10, 2006

(51) Int. Cl.
*H03M 1/12* (2006.01)

(52) U.S. Cl. .......................... 341/155; 360/46; 360/51

(58) Field of Classification Search ...................... None
See application file for complete search history.

(56) References Cited

U.S. PATENT DOCUMENTS

| | | | |
|---|---|---|---|
| 5,099,194 | A | 3/1992 | Sanderson et al. |
| 5,543,792 | A | 8/1996 | Johnson et al. |
| 5,693,885 | A | 12/1997 | Neidell |
| 6,032,284 | A | 2/2000 | Bliss |
| 6,084,916 | A * | 7/2000 | Ott ............................. 375/259 |
| 6,084,924 | A * | 7/2000 | Melas ......................... 375/340 |
| 6,249,395 | B1 | 6/2001 | Conway |
| 6,252,464 | B1 | 6/2001 | Richards et al. |
| 6,606,047 | B1 | 8/2003 | Borjesson et al. |
| 6,727,837 | B2 | 4/2004 | Ignjatovic et al. |
| 6,810,266 | B1 | 10/2004 | Ecklund et al. |
| 7,054,392 | B2 | 5/2006 | Chappaz |
| 7,231,001 | B2 * | 6/2007 | Aziz ........................... 375/319 |

* cited by examiner

*Primary Examiner*—Khai M Nguyen
(74) *Attorney, Agent, or Firm*—Fellers, Snider, et al.

(57) ABSTRACT

Method and apparatus for processing transmitted data. A sampling circuit preferably performs lossy sampling of a continuous signal to provide a corresponding sequence of discrete samples at a sampling rate less than a Nyquist rate of the continuous signal. A processing circuit reconstructs an informational content of the continuous signal from the discrete samples, and operates to periodically insert additional samples into the sequence, which preferably increases an effective rate of said sampling to match or exceed the Nyquist rate. Preferably, the lossy discrete samples are temporarily stored in a memory space prior to reconstruction by the processing circuit. The sampling circuit preferably comprises an analog-to-digital converter (ADC) of an analog front end (AFE). The processing circuit preferably comprises a digital back end (DBE) employing partial-response, maximum-likelihood (PRML) detection. The additional samples are preferably provided by an iterative timing recovery (ITR) block of the DBE.

19 Claims, 4 Drawing Sheets

COMMUNICATION CHANNEL WITH UNDERSAMPLED INTERPOLATIVE TIMING RECOVERY

FIELD OF THE INVENTION

The claimed invention relates generally to the field of data transmission systems and more particularly, but not by way of limitation, to a communication channel that employs undersampled interpolative timing to recover transmitted data.

BACKGROUND

Communication channels are generally used to process transmitted data. Such channels are useful in a variety of applications, such as telecommunications systems and data storage devices.

In some communication channels, an input continuous (e.g., analog) signal is sampled to provide a corresponding series of discrete (e.g., digital) samples. A variety of data recovery techniques can then be applied to the discrete samples to reconstruct the informational content of the input signal. Such recovery techniques can include partial-response, maximum likelihood (PRML) and decision-feedback equalization (DFE).

While it would appear that some informational content of the original input signal would be lost by converting the input signal to a series of discrete samples, this is not necessarily the case. The well-known Nyquist criterion generally provides that all of the informational content of a continuous signal can be recovered through sampling if the sampling rate is at least twice the highest frequency content (bandwidth) of the signal. This minimum sampling rate (twice the highest frequency) is referred to as the Nyquist rate.

By way of illustration, it is well known that the upper frequency response of the human ear is on the order of about 20 kHz; that is, humans generally cannot hear frequencies above this upper frequency threshold. Compact disc (CD) audio specifications sample original continuous audio signals at a nominal sampling rate of about 44.1 kHz, which is slightly above twice this upper frequency response (e.g., 40 kHz).

In this way, an original analog audio signal (e.g., a live performance) can be sampled at 44.1 kHz and the samples can be encoded and stored on a CD. During subsequent playback of the CD, the samples can be decoded and used to reconstruct an output analog signal that is fed to a speaker to produce a response that, to most hearers, is substantially indistinguishable from the original performance. Similar processing can be performed with other types of continuous signals such as composite video signals and transducer readback signals.

While communication channels that sample at or above the Nyquist rate have been found operable, there nevertheless remains a continued need for improvements in the art to provide channels that carry out signal processing with increased levels of performance. It is to these and other improvements that preferred embodiments of the present invention are generally directed.

SUMMARY OF THE INVENTION

Preferred embodiments of the present invention are generally directed to an apparatus and method for processing transmitted data.

In accordance with preferred embodiments, a communication channel includes a sampling circuit which performs lossy sampling of a continuous signal to provide a corresponding sequence of discrete samples at a sampling rate less than a Nyquist rate of the continuous signal.

A processing circuit of the channel reconstructs an informational content of the continuous signal from the discrete samples. The processing circuit is further configured to insert at least one, and preferably multiple, additional samples into the sequence to increase an effective rate of said sampling, preferably to a level that meets or exceeds the Nyquist rate.

An intermediate memory module preferably temporarily stores the samples in a memory space prior to reconstruction by the processing circuit. This allows the sampling and the subsequent processing to be decoupled and performed at different rates.

The sampling circuit preferably comprises an analog-to-digital converter (ADC) of an analog front end (AFE). The processing circuit preferably comprises a digital back end (DBE) employing partial-response, maximum-likelihood (PRML) detection. The additional samples are preferably provided by an iterative timing recovery (ITR) block of the DBE.

These and various other features and advantages which characterize the claimed invention will become apparent upon reading the following detailed description and upon reviewing the associated drawings.

DETAILED DESCRIPTION

Figure 1:
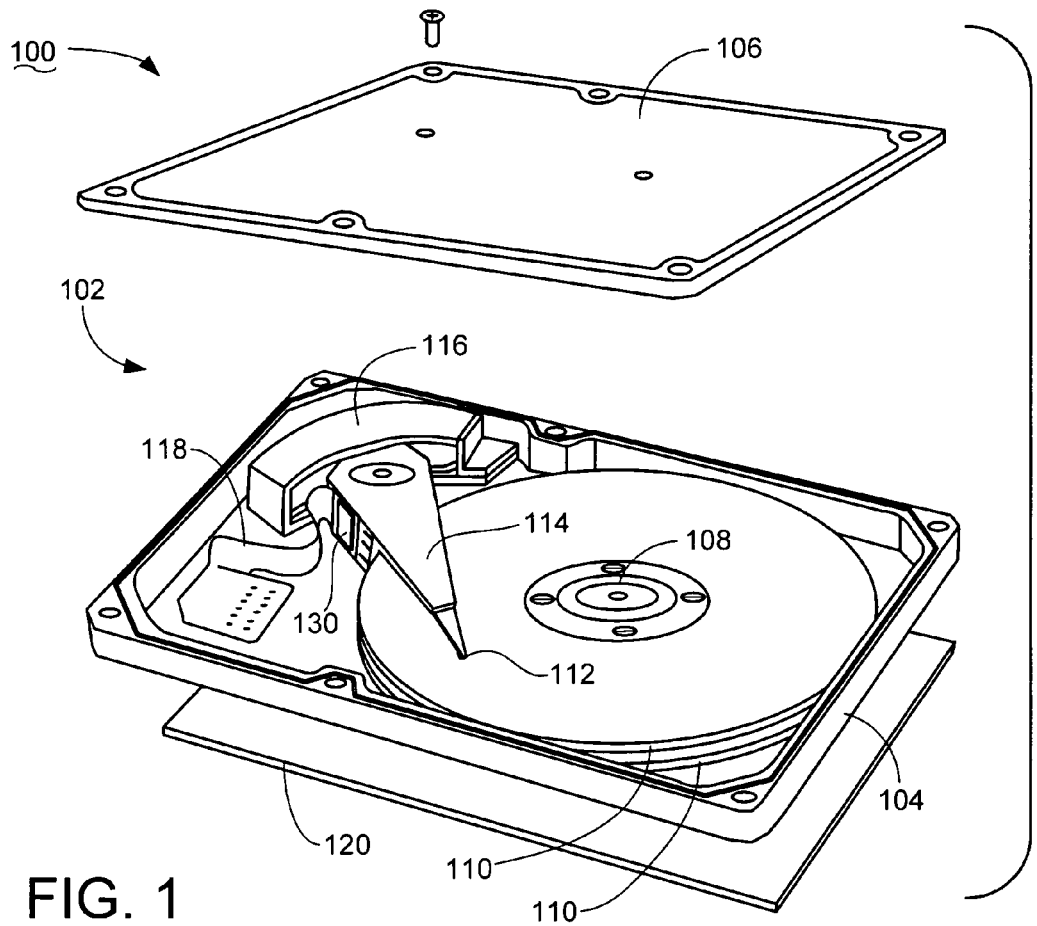
FIG. 1 is an exploded view of a data storage device constructed and operated in accordance with preferred embodiments of the present invention.

FIG. 1 shows an exploded view of a data storage device 100 to provide an exemplary environment in which preferred embodiments of the present invention can be advantageously practiced. The device 100 is preferably characterized as a hard disc drive of the type used to store and retrieve digital data in a computer system or network, consumer device, etc.

The device 100 includes a rigid, environmentally controlled housing 102 formed from a base deck 104 and a top cover 106. A spindle motor 108 is mounted within the housing 102 to rotate a number of data storage media 110 at a relatively high speed.

Data are arranged on the media 110 in concentric tracks which are accessed by a corresponding array of data transducing heads 112. The heads 112 (transducers) are supported by an actuator 114 and moved across the media surfaces by application of current to a voice coil motor, VCM 116. A flex circuit assembly 118 facilitates communication between the actuator 114 and control circuitry on an externally mounted printed circuit board, PCB 120.

Figure 2:
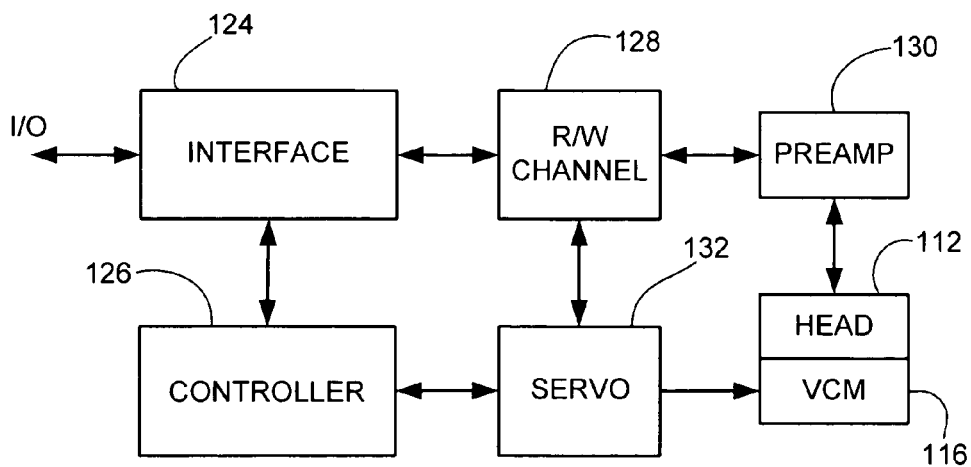
FIG. 2 is a generalized functional block diagram of the device of FIG. 1.

As shown in FIG. 2, the control circuitry preferably includes an interface circuit 124 which communicates with a host device using a suitable interface protocol. A top level processor 126 provides top level control for the device 100 and is preferably characterized as a programmable, general purpose processor with suitable programming to direct the operation of the device 100.

A read/write channel 128 operates in conjunction with a preamplifier/driver circuit (preamp) 130 to write data to and to recover data from the discs 108. The preamp 130 is preferably mounted to the actuator 114 as shown in FIG. 1. A servo circuit 132 provides closed loop positional control for the heads 112.

The preamp 130, R/W channel 128 and interface 124 generally form a communication channel path between the transducers 112 and the host device. A preferred construction for this communication channel is set forth at 140 in FIG. 3. From a top level standpoint, the channel 140 is generally characterized as having an analog front end (AFE) 142, a digital back end (DBE) 144, and an intermediary memory module (IMM) 146.

An input continuous signal is supplied to the preamp 130 via path 148 from a selected transducer 112. While not limiting, in the present example this input signal is preferably characterized as an analog data readback signal obtained through the magnetic interaction between the transducer 112 and a corresponding track on the associated media surface.

The signal on path 148 will generally comprise a frequency content associated with a rate at which data were initially written to the track, and will include pulses that correspond to magnetic transitions that were formed during the previous write operation. Although not limiting, it is contemplated that the transducers 112 each have a giant magneto-resistive (GMR) construction and the media 110 each support perpendicular recording techniques.

The preamp 130 applies preamplification and other signal conditioning to the input signal to supply a preamplified signal to a variable gain amplifier (VGA) stage 150. The VGA 150, in conjunction with an adaptive low pass filter 152 and automatic gain control (AGC) stage 154, carry out various equalization and anti-aliasing operations so as to substantially normalize the signal to a selected magnitude (voltage) range suitable for subsequent processing.

An analog phase lock loop (PLL) 156 provides closed loop timing and accommodates different recording frequencies at different locations on the media (such as through the use of zone based recording, ZBR). In this way, in the exemplary environment of the device 100, it will be understood that readback signals from different radial locations (e.g., sets of tracks) will each have a different frequency spectrum due to different recording frequencies applied thereto.

The normalized signal is next sampled by an analog-to-digital converter (ADC) 158 to provide a corresponding sequence of discrete (in this case multi-bit digital) samples. As explained in greater detail below, the ADC 158 is preferably configured to carry out lossy sampling; that is, the rate at which the ADC 158 samples the input signal is preferably selected to be less than the Nyquist rate for the input signal. For reference, the aforementioned AFE 142 preferably comprises at least the VGA 150, filter 152, AGC 154, PLL 156 and ADC 158.

The output sequence of discrete samples is supplied to a memory device 160 for temporary storage therein. The samples are preferably sequentially indexed so as to maintain (or otherwise track) the samples in an order corresponding to an order in which the samples were received. A first-in-first-out (FIFO) block 162 is configured to sequentially output the samples as required by the DBE 144.

Memory allocation and control is carried out by a control block 164, which also preferably establishes the lossy sampling rate of the ADC 158. For reference, the aforementioned IMM 146 at least comprises the memory 160, FIFO 162 and control block 164.

The aforementioned DBE 144 can take a number of configurations, and preferably comprises a finite impulse response (FIR) block 166, an iterative timing recovery (ITR) block 168, a decoder 170, a digital PLL block 172, an output buffer 174 and an on-the-fly error correction code (ECC) block 176. While a variety of digital signal processing techniques can be utilized, the FIR 166 preferably utilizes a series of internal delay blocks and tap weight coefficient addition blocks to filter sequential groups of the samples to a selected class of partial-response waveforms, such as EPR4.

The ITR 168 applies timing recovery functions including the periodic insertion of additional samples to the sequence as explained below. The decoder 170 decodes the processed sequence such as through the use of maximum-likelihood detection to provide encoded data values to the buffer 174. Timing control is supplied by the digital PLL 172. Although not shown in FIG. 3, control inputs are supplied to both PLL circuits 156, 172 by the control block 164.

The output samples placed in the buffer 174 are preferably processed by the ECC block 176 to detect and correct up to selected numbers of bit errors in the output sequence. When the ECC block 176 concludes that there are no uncorrectable errors in the resulting processed data, the data are released for use by the host via path 178. It will be understood that the output data on path 178 nominally have the same informational content as originally written to the media 110.

The IMM 146 serves to decouple the AFE 142 from the DBE 144 so that the downstream digital signal processing can take place at a rate different from the input ate of the upstream analog processing. The IMM 146 also provides at least some measure of "persistence" of the discrete samples in the channel 140 during such processing.

This advantageously allows the samples to be processed by the DBE 144 in an order that is different from an order in which the samples were received. This also supports the reintroduction of selected sets of samples to the DBE 144 for processing using different parametric settings when a prior pass was unsuccessful in correctly decoding the samples.

Figure 3:
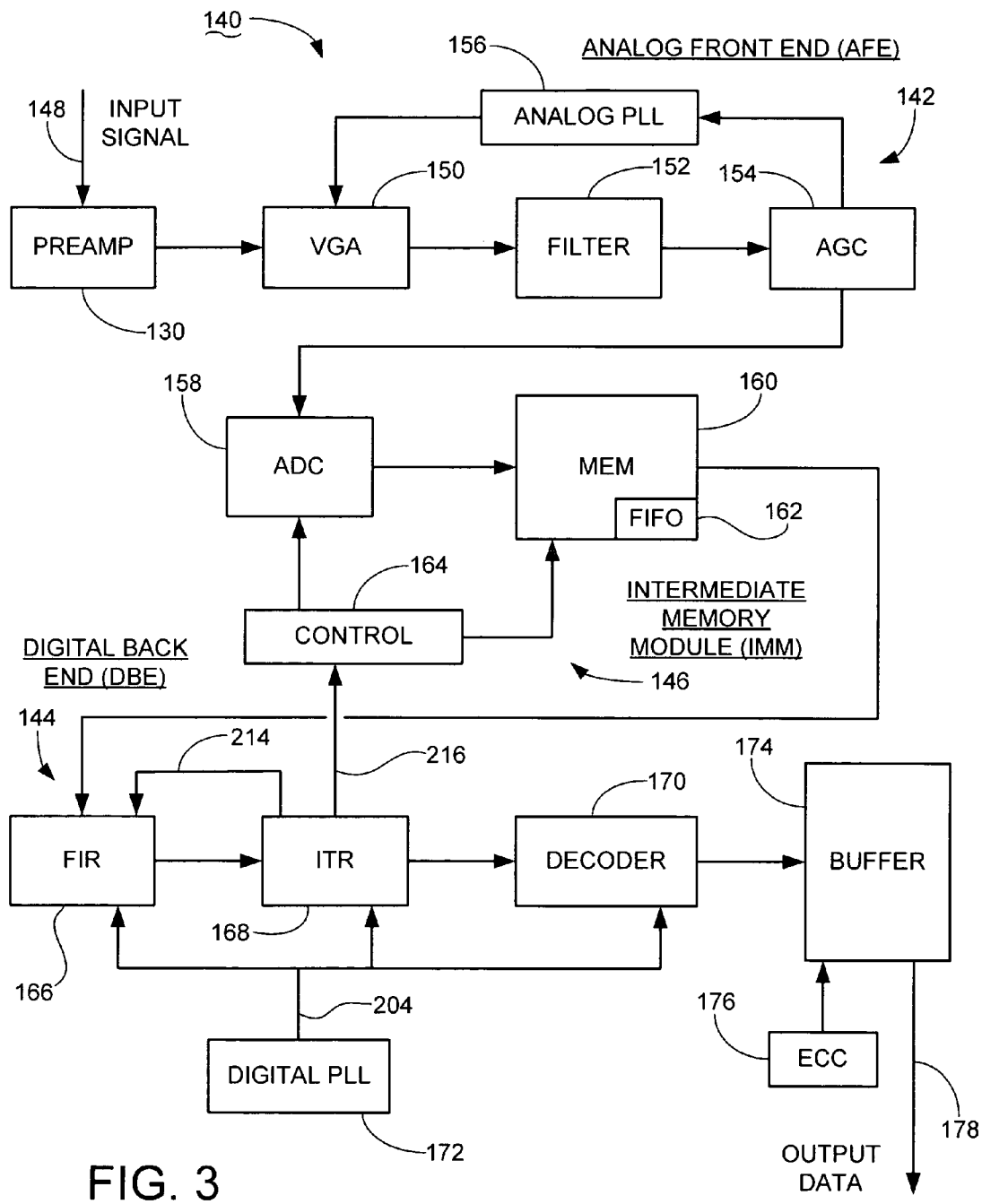
FIG. 3 provides a generalized functional block diagram of relevant portions of communication channel circuitry set forth in FIG. 2 in accordance with preferred embodiments.
Figure 4:
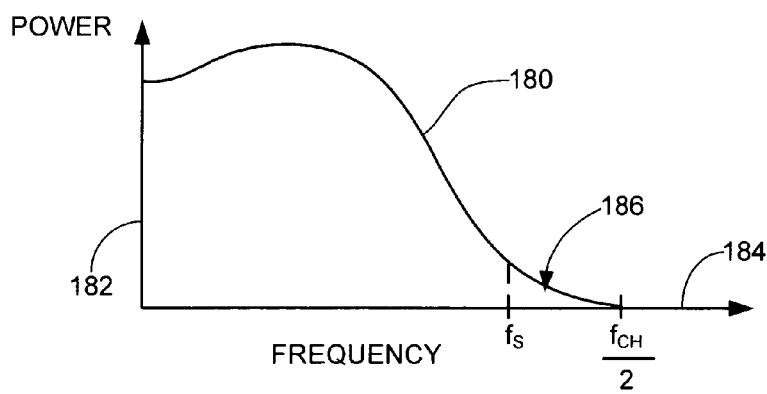
FIG. 4 is a waveform of informational (spectral power) content of continuous signals processed by the circuitry of FIG. 3.

FIG. 4 sets forth a graphical representation of a curve 180 generally representative of the frequency content associated with a given set of input continuous signals supplied to the circuitry of FIG. 3. The curve 180 is plotted against a frequency domain x-axis 184 and an amplitude (power) y-axis 182.

The variable $f_{CH}$ corresponds to the Nyquist frequency of the channel 140 and nominally represents twice the highest frequency component of the signal 180. The value $f_{CH}/2$ thus corresponds to the highest frequency component of the input continuous signal. The Nyquist rate $R_N$ is $1/f_{CH}$.

At this point it will be noted that the curve 180 is shown to be essentially bandlimited at $f_{CH}/2$ (i.e., there are no frequencies of interest higher than $f_{CH}/2$). Alternatively, $f_{CH}/2$ can describe a conventional upper cutoff point for the frequencies of interest (such as a −3 dB point, etc.). For reference, to the extent that the input continuous signal on path 148 has higher frequency components than that represented in FIG. 4, in some embodiments such can be removed by operation of the low pass filter 152.

FIG. 4 further shows a frequency $f_S$ less than $f_{CH}/2$. The frequency $f_S$ is a sampling frequency at which samples are obtained by the ADC 158 ($R_S$ is the sampling rate and equals $1/f_S$). This provides lossy sampling to the extent that the informational content of portion 186 below curve 180 and between $f_S$ and $f_{CH}/2$ will generally not be reflected in the discrete samples. However, the portion 186 represents a relatively small area as compared to the entire informational content represented by curve 180.

The extent to which the actual sampling rate can be made less than the Nyquist rate (e.g., $f_S < f_{CH}/2$) will depend on various factors, including the frequency spectrum of the continuous signal and the decoding capabilities of the DBE 144. In the present case, an exemplary undersampling value is contemplated as being on the order of about 95%, while other values higher or lower than this value can be utilized as well. Those skilled in the art will recognize that undersampling at 95% of the Nyquist rate will generally provide 19 discrete samples over a given time interval for which 20 samples would have satisfied the Nyquist criterion (e.g., 19/20=0.95).

Figure 5:
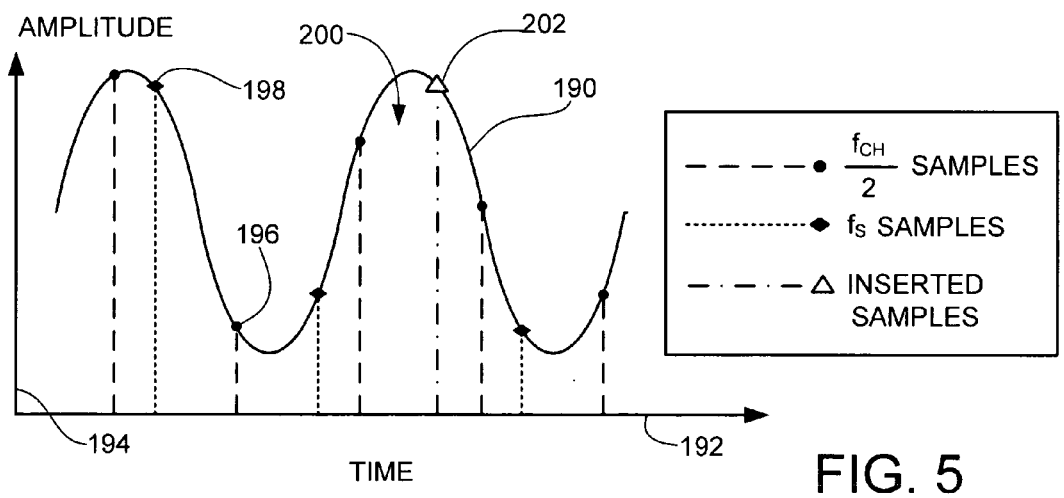
FIG. 5 shows a simplified graphical representation of undersampling and the periodic insertion of additional samples by the circuitry of FIG. 3.

FIG. 5 provides a simplified graphical representation of a portion of a continuous signal 190 processed by the circuitry of FIG. 3, plotted against an elapsed time x-axis 192 and a signal amplitude y-axis 194. A first set of samples at the Nyquist frequency $f_{CH}/2$ are represented at 196 and are marked by dashed lines and circular dots. A second set of samples at the lossy sampling frequency $f_S$ are represented at 198 and are marked by dotted lines and diamond shaped dots. For clarity, the $f_{CH}/2$ samples are shown merely for reference; such samples are not preferably taken during operation of the circuitry of FIG. 3.

Depending on the relationship between $f_S$ and $f_{CH}/2$, it is contemplated that most of the time there will be a one-to-one correspondence between each $f_S$ sample and a corresponding $f_{CH}/2$ sample. Stated another way, as shown in FIG. 5, there will usually be one $f_{CH}/2$ sample between each successive pair of $f_S$ samples. Every so often, however, there will be an interval in which two successive $f_{CH}/2$ samples would appear without an intervening $f_S$ sample, such as shown at interval 200.

In such case, the circuitry of FIG. 3 preferably operates to insert an additional sample within the sequence, as indicated by inserted sample 202 (shown by dot-dash line and white triangle dot). It can be seen that the additional sample serves to increase the effective sampling rate of the sequence of discrete samples provided to the DBE 144. Although not limiting, in preferred embodiments the number and frequency of these additional samples 202 are provided in order to bring the effective sampling rate to a level that is equal to or greater than the Nyquist rate.

Figure 6:
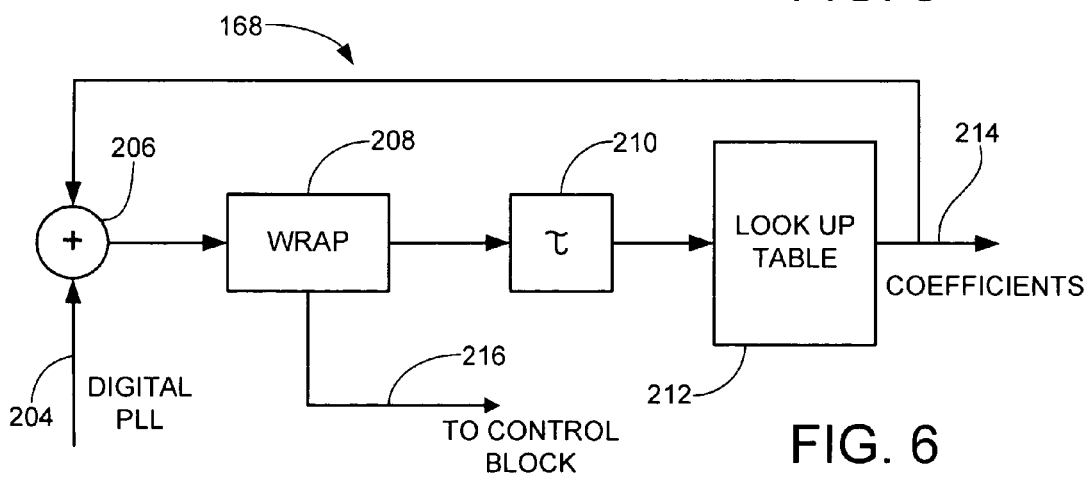
FIG. 6 is a functional representation of relevant portions of the interpolative timing recovery (ITR) block of FIG. 3.

A preferred manner in which additional samples such as 202 are generated and inserted is set forth by FIG. 6, which shows relevant portions of the ITR block 168 of FIG. 3. A digital PLL clock signal is input from PLL 172 on path 204 to an adder block 206. A wrap function block 208 generally tracks the polarity of the fS samples and provides a corresponding output τ (block 210) that serves as an entry to a lookup table 212.

The table 212 outputs on path 214 the corresponding set of tap weight coefficients suitable for use by the FIR 166 for the associated samples. The output coefficients are further supplied as an input to the adder 206.

Preferably, the wrap block 208 detects when an additional sample is required, and provides an indication via path 216 to the control block 164. In response, the control block 164 temporarily halts the release of the next sample from FIFO 162 and instructs the FIR 166 to perform a second processing pass using the then existing samples with the new coefficients supplied via path 214.

In this way, the ITR 168 serves to effectively insert an interpolated sample into the sequence. Other methodologies for periodically inserting samples into the sequence can readily be used, however, including randomly generated samples, samples at a fixed magnitude with polarity selected in relation to the two immediately adjacent samples, samples generated in view of averages of multiple adjacent samples, and so on.

It will be noted at this point that irrespective of the manner in which the inserted samples are generated, such samples will not provide the same level of data integrity as would be supplied if the input signal were sampled by the ADC at (or above)the Nyquist rate. However, it is contemplated in that in many applications the ability of the maximum likelihood (or similar) detection operations such as by decoder 170, along with the ECC functions of block 176 will facilitate a true indication of the original informational content in the output data.

Undersampling the input signal in this way can provide several important operational advantages, including reduced power and processing requirements of the circuitry, lower clock speeds, and reduced memory (buffering) capacity for the IMM 146. Higher frequency input signals can also be accommodated since the processing rate limitations of the DBE 144 are not tied to the Nyquist frequency of the input signal.

Figure 7:
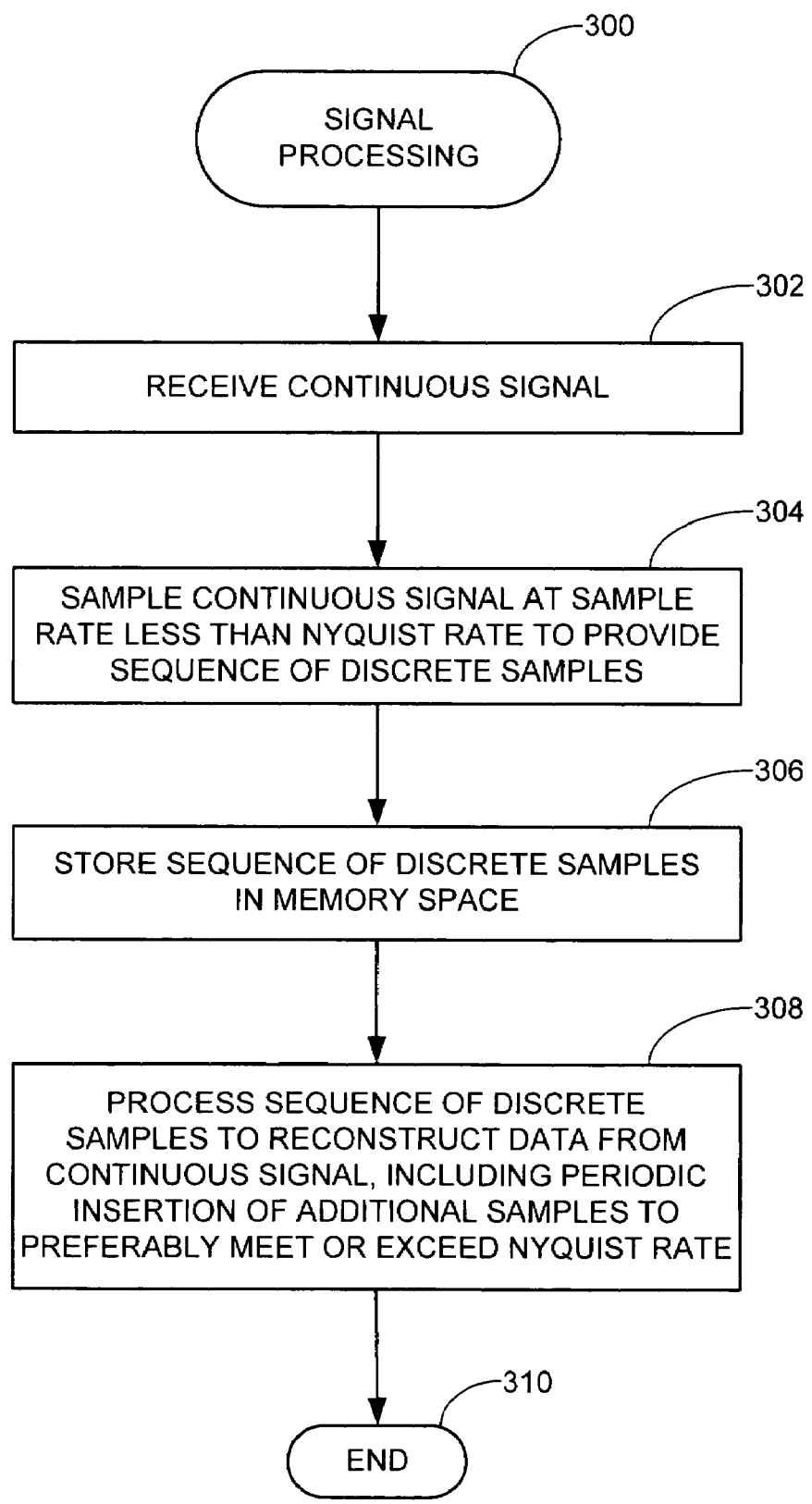
FIG. 7 is a flow chart for a SIGNAL PROCESSING routine, generally illustrative of steps carried out in accordance with preferred embodiments of the present invention.

FIG. 7 provides a flow chart for a SIGNAL PROCESSING routine 300, generally illustrative of steps carried out in accordance with preferred embodiments of the present invention.

At step 302, a continuous signal is first received, such as at path 148 in FIG. 3. This step can preferably include a number of signal pre-processing operations such as carried out by the VGA 150, filter 152 and AGC 154.

The continuous signal is next sampled at step 304 at a sample rate that is less than the Nyquist rate to provide a corresponding sequence of discrete samples. This is preferably carried out by a sampling circuit such as the AGC 158 of FIG. 3 in the manner discussed above to provide lossy sampling of the input signal.

As shown by step 306, the sequence of discrete samples is preferably stored in a memory space such as in the IMM 146. The samples are further preferably indexed so as to track the order in which the samples are received. Because of the decoupling provided by the IMM 146. As mentioned previously, the subsequent processing of these samples can take place in an order different from the order in which the samples were received.

At step 308, the samples are processed by a processing circuit to reconstruct an informational content of the input signal. The processing circuit is preferably exemplified by the DBE 144, but this is not limiting; rather, the processing circuit can take any number of forms depending on the requirements of a given application, and can be realized in programming code executable by a programmable processor, in hardware, etc.

The processing step 308 preferably includes the periodic insertion of additional samples into the sequence in order to reduce the effects of the lossy sampling of step 304. Preferably, the number of samples inserted into the sequence is sufficient to approximate or exceed the Nyquist rate. The process then ends at step 310.

While preferred embodiments have been presented herein in the environment of a data storage device, such as is merely for purposes of illustration and is not limiting. The claimed invention can be embodied in any number of different types of environments and can process any number of different types of signals, including audio, video, graphics, parametric data, and so on.

For purposes of the appended claims, the phrase "Nyquist rate" will be given its ordinary and customary meaning as set forth herein and as understood by a skilled artisan as the minimum sampling rate at which recovery of the informational content of a continuous signal can be theoretically achieved from such sampling in accordance with the Nyquist criterion, apart from any additional post-processing such as disclosed herein.

Similarly, the phrase "continuous signal" will be defined broadly in accordance with its ordinary and customary meaning as set forth herein and as understood by a skilled artisan as a signal having a varying quantity that can be expressed as a continuous function of an independent variable such as time.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular control environment without departing from the spirit and scope of the present invention.

What is claimed is:

1. An apparatus comprising:
  a sampling circuit which performs lossy sampling of a continuous signal to provide a corresponding sequence of discrete samples at a sampling rate less than a Nyquist rate of the continuous signal;
  a processing circuit which reconstructs an informational content of the continuous signal from the discrete samples, the processing circuit configured to insert at least one additional sample into said sequence to increase an effective rate of said sampling; and
  a memory space coupled between the sampling circuit and the processing circuit which temporarily stores the sequence of discrete samples.

2. The apparatus of claim 1, wherein the continuous signal is characterized as an analog voltage signal.

3. The apparatus of claim 1, wherein each sample in the sequence of discrete samples comprises a multi-bit digital value.

4. The apparatus of claim 1, wherein the sampling circuit comprises an analog-to-digital converter (ADC).

5. The apparatus of claim 1, wherein the processing circuit processes the samples in an order that is different from an order in which the samples are provided by the sampling circuit.

6. The apparatus of claim 1, wherein the processing circuit comprises a digital finite impulse response (FIR) block which processes the sequence of discrete samples.

7. The apparatus of claim 1, wherein the processing circuit further comprises an iterative timing recovery (ITR) block which generates and inserts said at least one additional sample into said sequence.

8. The apparatus of claim 1, wherein the additional samples increase an effective sampling rate of the continuous signal to a level that meets or exceeds the Nyquist rate.

9. The apparatus of claim 1, wherein the continuous signal is derived from a transducer that transduces data stored to a storage medium.

10. An apparatus comprising a sampling circuit configured to generate a sequence of discrete samples by sampling a continuous signal at a sampling rate less than a Nyquist rate of the continuous signal, and a processing circuit which periodically inserts additional samples into the sequence of discrete samples to increase an effective rate of said sampling to an effective level that approximates or exceeds the Nyquist rate, and wherein the processing circuit processes the sequence of discrete samples in an order that is different from an order in which said samples are received.

11. The apparatus of claim 10, wherein the processing circuit comprises an iterative timing recovery (ITR) block which periodically inserts the additional samples into the sequence of discrete samples.

12. The apparatus of claim 10, wherein the sampling circuit samples the continuous signal at a sampling rate that corresponds to substantially 95% of the Nyquist rate.

13. A method comprising steps of:
  performing lossy sampling of a continuous signal to provide a corresponding sequence of discrete samples at a sampling rate less than a Nyquist rate of the continuous signal;
  temporarily storing the discrete samples in a memory space; and
  reconstructing an informational content of the continuous signal from the stored discrete samples, wherein said reconstructing comprises inserting at least one additional sample into said sequence to increase an effective rate of said sampling.

14. The method of claim 13, wherein the lossy sampling of the performing step is carried out by a circuit comprising an analog to digital converter (ADC).

15. The method of claim 13, wherein the reconstructing step is carried out by a circuit comprising a finite impulse response (FIR) block and an interpolative timing recovery (ITR) block, the ITR block configured to generate said at least one additional sample.

16. The method of claim 13, wherein the reconstructing step processes the discrete samples in an order that is different from an order in which said samples are received from the memory space.

17. The method of claim 13, wherein the additional samples of the reconstructing step increase an effective sampling rate of the continuous signal to a level that meets or exceeds the Nyquist rate.

18. The method of claim 13, further comprising a step of deriving the continuous signal from a transducer that transduces data stored to a storage medium.

19. The method of claim 13, wherein the reconstructing step comprises a first processing step in which the discrete samples are output from the memory space a first time and processed using a first parameter which fails to successfully reconstruct the informational content, and wherein the reconstructing step further comprises a second, subsequent processing step in which the discrete samples are output from the memory space a second time and processed using a different, second parameter which successfully reconstructs the informational content.

* * * * *